United States Patent
Stanforth

(10) Patent No.: US 7,072,650 B2
(45) Date of Patent: Jul. 4, 2006

(54) AD HOC PEER-TO-PEER MOBILE RADIO ACCESS SYSTEM INTERFACED TO THE PSTN AND CELLULAR NETWORKS

(75) Inventor: Peter Stanforth, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 661 days.

(21) Appl. No.: 09/897,790

(22) Filed: Jun. 29, 2001

(65) Prior Publication Data

US 2002/0058502 A1    May 16, 2002

Related U.S. Application Data

(60) Provisional application No. 60/248,182, filed on Nov. 13, 2000.

(51) Int. Cl.
*H04Q 7/00* (2006.01)
(52) U.S. Cl. .................. 455/426.2; 455/41.2; 370/338
(58) Field of Classification Search ............. 455/41.2, 455/11.1, 426.2, 555, 518; 370/338
See application file for complete search history.

(56) References Cited

U.S. PATENT DOCUMENTS

| | | | |
|---|---|---|---|
| 4,494,192 A | 1/1985 | Lew et al. ................. 364/200 |
| 4,617,656 A | 10/1986 | Kobayashi et al. ........... 370/74 |
| 4,736,371 A | 4/1988 | Tejima et al. ................. 370/95 |
| 4,742,357 A | 5/1988 | Rackley ...................... 342/457 |
| 4,747,130 A | 5/1988 | Ho ............................... 379/269 |
| 4,910,521 A | 3/1990 | Mellon ......................... 342/45 |
| 5,034,961 A | 7/1991 | Adams ......................... 375/130 |
| 5,068,916 A | 11/1991 | Harrison et al. .............. 455/39 |
| 5,231,634 A | 7/1993 | Giles et al. ................... 370/95.1 |
| 5,233,604 A | 8/1993 | Ahmadi et al. ................ 370/60 |
| 5,241,542 A | 8/1993 | Natarajan et al. ........... 370/95.3 |
| 5,317,566 A | 5/1994 | Joshi ............................. 370/60 |
| 5,392,450 A | 2/1995 | Nossen ...................... 455/12.1 |
| 5,412,654 A | 5/1995 | Perkins ...................... 370/94.1 |

(Continued)

FOREIGN PATENT DOCUMENTS

CA    2132180    3/1996

(Continued)

OTHER PUBLICATIONS

"Toplogy Control of Multihop Wireless Networks using Transmit Power Adjustment", by Ram Ramanathan and Regina Rosales-Hain; BBN Techn-ologies (Division of GTE), Cambridge, Mass. 1997.

(Continued)

*Primary Examiner*—Nick Corsaro
(74) *Attorney, Agent, or Firm*—Gardner Carton & Douglas, LLP; Joseph J. Buczynski

(57) ABSTRACT

An ad-hoc, peer-to-peer radio access system for cellular communications systems using time division duplex as a way of maximizing the bits/hz/km2 for cellular systems. The network architecture of the ad-hoc system allows the radio access to be integrated with the fixed components of a conventional cellular system, PSTN or ISP. The objective is to make the system of the invention transparent to the features and services provided by the external network. The advantages of such a system to a cellular operator are that significantly less infrastructure is required, and that the RF spectrum is more efficiently utilized resulting in much lower building and operating costs. The system architecture is comprised of remote terminals, routers, gateways, and at least one gateway controller that interfaces the ad-hoc system to a cellular network system. The ad-hoc system of the invention allows for both voice and data transmissions and receptions.

3 Claims, 16 Drawing Sheets

U.S. PATENT DOCUMENTS

| | | | |
|---|---|---|---|
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,533,026 A | 7/1996 | Ahmadi et al. | 370/94 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,748,624 A | 5/1998 | Kondo | 370/347 |
| 5,774,876 A | 6/1998 | Wooley et al. | 705/28 |
| 5,781,540 A | 7/1998 | Malcolm et al. | 370/321 |
| 5,787,076 A | 7/1998 | Anderson et al. | 370/294 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor | 370/280 |
| 5,956,331 A * | 9/1999 | Rautiola et al. | 370/338 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,016,311 A | 1/2000 | Gilbert et al. | 370/280 |
| 6,028,853 A | 2/2000 | Haartsen | 370/338 |
| 6,029,074 A | 2/2000 | Irvin | 455/571 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,058,106 A | 5/2000 | Cudak et al. | 370/336 |
| 6,064,626 A | 5/2000 | Stevens | 365/233 |
| 6,067,291 A | 5/2000 | Kamerman et al. | 370/338 |
| 6,067,297 A | 5/2000 | Beach | 370/389 |
| 6,078,566 A | 6/2000 | Kikinis | 370/286 |
| 6,088,337 A | 7/2000 | Eastmond et al. | 370/280 |
| 6,097,704 A | 8/2000 | Jackson et al. | 370/280 |
| 6,104,712 A | 8/2000 | Robert et al. | 370/389 |
| 6,108,316 A | 8/2000 | Agrawal et al. | 370/311 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | van Bokhorst et al. | 455/343 |
| 6,208,870 B1 | 3/2001 | Lorello et al. | 455/466 |
| 6,222,463 B1 | 4/2001 | Rai | 340/928 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,307,843 B1 * | 10/2001 | Okanoue | 370/312 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,359,872 B1 | 3/2002 | Mahany et al. | 370/338 |
| 6,775,258 B1 * | 8/2004 | van Valkenburg et al. | 370/338 |
| 2001/0053699 A1 | 12/2001 | McCrady et al. | 455/513 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

"Reversing the Collision-Avoidance Handshake in Wireless Networks" by J.J. Garcia-Luna-Aceves and Asimmakis Tzamaloukas; Baskin School of Engineeering, University of California, Santa Cruz, 1997.

"Self-Organizing, Self-Healing Wireless Networks", by Chip Elliot and Bob Helle; BBN Technologies, Cambrdge. Mass: IEEE, 2000.

"A Perfromance Comparison of Multi-Hop Wireless Ad Hoc Netwrk Routing Protocols", by Josh Broch, et al., Carnegie Mellon University, Pttsburgh, Pa., Proceedings of the Fourth Annual ACM/IEEE International Conference on Mobile Computing and Networking, 1998.

"USAP:A Unifying Dynamic Distributed Multichannel TDMA Slot Assignment Protocol", by C. David Young,Rockwell International, Richardson,Texas.

"Transmission-Efficient Routing in Wireless Networks Using Link-State Information", by J.J. Garcia-Luna-Aceves, Baskin School of Engineering, University of California, Santa Cruz; 1997.

"The Core-Assisted Mesh Protocol", by J.J. Garcia-Luna-Aceves and Ewerton L. Madruga, Baskin School of Engineering, University of California, Santa Cruz; 1997.

"Optimization of an Adaptive Link Control Protocol for Multimedia Packet Radio Networks", by J.R.McChesney, et al.; ITT Industries Aerospace Comm. Div.; Ft.Wayne,IN ;1997.

"Hierarchically-Organized, Multihop Mobile Wireless Networks for Quality-of-Service Support", by Ram Ramanathan and Martha Steenstrup; BBN Systems and Tech., Cambridge, Mass. 1995.

"Dynamic Multipoint Virtual Circuits for Multimedia Traffic in Multihop Mobile Wireless Networks", by Martha E. Steenstrup; BBN Tech., Cambridge, Mass. 1995.

"Packet-Based Multimedia Communications Systems" (H.323) ITU-T Recommendations H.323; International Telecommunications Union;Nov. 2000.

"Collision-Avoidance Transmission Scheduling for Ad-Hoc Networks", by Zhenyu Tand and J.J. Garcia-Luna-Aceves, University of California Santa Cruz, Calif., 1997.

"QoS Networking with Adaptive Link Control and Tactical Multi-Channel Software Radios", by George Vardakas, et al., Communications Systems Div. of Raytheon Systems Co., San Diego, Calif.; 1997.

Reversing the Collision Avoidance Handshake in WirelessN Networks, J.J. Garcia-Luna-Aceves, etal.;University of Calif.; 1997.

"Net Throughput with IEEE 802.11 Wireless Lans", Lucent Technoligies.

"Topology Control of Multihop Wireless Networks Using TransmitPower Adjustment", BBN Technologies, 1997.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar.3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Zhenyu Tang and J.J. Garcia-Luna-Aceves, "Collision-Avoidance Tranmission Scheduling for Ad-Hoc Networks".

* cited by examiner

MOBILE ORIGINATION
AD HOC TERMINAL TO CELL SYSTEM

MOBILE TERMINATION

CELL SYSTEM TO
AD HOC TERMINAL

MOBILE CLEARING

AD HOC PEER-TO-PEER MOBILE RADIO ACCESS SYSTEM INTERFACED TO THE PSTN AND CELLULAR NETWORKS

CROSS REFERENCE TO RELATED APPLICATION

Priority of provisional application Ser. No. 60/248,182, filed on Nov. 13, 2000 is hereby claimed.

BACKGROUND OF THE INVENTION

The present invention is directed to the use of an Ad Hoc peer-to-peer radio access system together with Time Division Duplex (TDD) as a way of maximizing the bits/hz/km2 for cellular systems. The invention is directed to radio access schemes and network architecture that allows radio access to be integrated with the fixed components of a conventional cellular system, PSTN, and the Internet. The objective is to make the system of the invention transparent to the features and services provided by the extraneous network infrastructure. The advantages of such a system to a cellular operator are that significantly less infrastructure is required, and that the RF spectrum is more efficiently utilized resulting in much lower building and operating costs.

Cellular communications systems have been deployed for over 20 years using a proven FDMA scheme that is very efficient for voice communications. Such schemes are employed by all current cellular systems including AMPS, TACS, NMT, GSM, IS-136 and IS-95. This same scheme is proposed for the next generation cellular systems named 3G.

With the arrival of laptop computers, portable digital assistants (PDAs) and high-tech cellular phones, consumers are beginning to request mobile data services in addition to traditional voice services. Some mobile data services have already been overlaid on top of FDMA cellular systems, but because of the inefficiencies of FDMA outlined below, these data services provide very limited bandwidth to the end user, which are typically 9600 baud in the current generation of cellular systems. Time Division Duplex (TDD) systems are typically used for packet data systems as they make much more efficient use of the available bandwidth in order to deliver a much higher effective data rate to the end user. TDD is typically used in fixed wired solutions or point-to-point wireless systems because it has its own spectrum limitations as described below. TDD systems, however, have not been deployed for voice systems.

FDMA provides a simple mechanism for guaranteeing quality of service and low latency for voice communication, but does so by inefficiently using the available spectrum. For example, a voice conversation between a mobile phone and a base station requires an up-link to send on and a down-link to receive on. Most conversations consist of one person talking while the other listens, with silent pauses in between. This results in channel utilization of less than 40%. In addition, FDMA employs a method that breaks the available spectrum into discrete blocks called channels. This provides a mechanism for reuse of spectrum using cells. Although there are different reuse schemes in use, they all fundamentally do the same thing. The geographic region for which coverage is required is broken down into a large number of cells. The set of available channels is broken up into at least 3, but typically 7, subsets, and divided up amongst the cells, so that there are no common frequencies in any adjacent cells, as seen in FIG. 1. The result of this reuse method is that the bits/hertz/km2 are, at best, only ⅓ the potential that is available for the spectrum allocated to the cellular operator.

Spectral efficiency is a key economic factor in wireless communications because of the limited availability and high cost of spectrum. Wireless operators are constantly striving to improve spectral efficiency on these grounds, but cellular methodologies can only do this by deploying more, equally expensive, infrastructure.

The basic architecture of a cellular system is the same for all existing and proposed RF technologies. The international GSM architecture, as shown in FIG. 2, is used as a reference model. For North American systems IS-634 replaces GSM-A and IS-41 replaces GSM-MAP. The important factor is that modem cellular systems are decomposed into logical functional units, with well-defined interfaces between them.

The present invention removes the FDMA-based radio subsystems and radio interfaces, and replaces them with an Ad Hoc radio access system. The key component of the invention is how the system of the present invention is interlaced with the cellular system's infrastructure to provide a function of transparency to the cellular network operator and the mobile customer when the system of the invention is employed.

With respect to the using the system of the present invention as a stand-alone mobile radio network system, it is noted that although many forms of ad-hoc networking are extant, none allows for a peer-to-peer ad-hoc network to interwork with other networks, as that of the system of the present invention. The most widely known specification is that defined in the IEEE 802.11 standard. The system of the present invention may be applied to any 802.11 system, and would provide similar benefits. The system of the invention could also be applied to many other radio access schemes, such as Orthogonal Frequency Division Multiplexing (OFDM) in a similar manner. The present invention enhances the basic routing protocols and provides additional components required to allow for seamless integration with other telecommunications systems. As such, system would provide commercial mobile voice and mobile internet service to a user of the system.

In commonly-owned, copending U.S. patent application Ser. No. 09/815,157, filed on Mar. 22, 2001, entitled "Time Division Protocol for an Ad-Hoc, Peer-to-Peer Radio Network Having Coordinating Channel Access to Shared Parallel data Channels with Separate Reservation Channel", now U.S. Pat. No. 6,817,165, there is disclosed a novel protocol for an ad-hoc, peer-to-peer radio network system having coordinating channel access to shared parallel data channels via, a separate reservation channel. This network system having coordinating channel access to shared parallel data channels via a separate reservation channel is directed to a network system, such as the ad-hoc radio network system of the present application, where each node, or radio terminal, of the network is capable of serving as a node or hop of a routing path of a call from another, or to another radio terminal. In this system, communication between nodes or radio terminals is achieved using Carrier Sense Multiple Access with Collision Avoidance (CSMA/CA) protocol with the addition of multiple parallel data channels serviced by one reservation channel. By dedicating a separate reservation channel for the multiple parallel data channels, collision-free access by all of the competing nodes or terminals of the service group of the network is greatly reduced. Communications between terminals or nodes is setup by information exchanged on the separate reservation channel, which information includes all of the call set-up information such as data channel desired to be used for transferring voice, video or data, the desired power level of at least initial transmission, messaging such as Request-to-Send (RTS), Clear-to-Send (CTS), Not-Clear-to-Send (NCLS), Acknowledgment (ACK) for indicating reception of the transmitted call, Non-Acknowledgment (NACK) for indicating improper reception of the call, etc. In this system, in order to further ensure fast, adequate and collision-free transmission and reception, besides a primary modem typically provided with the transceiver of each node or terminal, a secondary modem is also provided which is dedicated to the reservation channel. This system also provides for collision free transmission and reception between nodes or terminals by transmitting the reservation and data channels in time slots of time frames, with the information as to which time slot is to be used being included in the messaging transmitted by the reservation channel. Such a format not only provides collision-free transmission, but also allows for Quality-of-Service (Q0S) for different types of Class-of-Service (Co S), Thus, not only may voice and video be transmitted, besides data, but voice and video transmission may be prioritized, so that when competing calls vie for a data channel, the delay-dependent voice or video transmissions will take precedence. This prioritization is accomplished by assigning prioritized calls for transmission in earlier time slots of a time frame. This network system ensures that every node or terminal of a service set of terminals has the most information regarding all of other terminals of that service set, so that the choice of data channel to be used, any required delay is transmitting the call, information on power level, and the like, are checked and updated by each terminal by a practically continuous monitoring of the reservation channel. The system of the invention utilizes protocol that provides collision-free channel access, which also emphasizes improving geographic reuse of the frequency spectrum. The ad-hoc, peer-to-peer radio system of this patent does not have, nor require, a base station, as conventional cellular systems, personal communications system (PCC), and the like, require; instead, each radio terminal forming part of the ad-hoc, peer-to-peer radio system may alternatively serve as a base station, in addition to being an ordinary link terminal of the radio system, whereby, if one such terminal serving as a base station should for some reason become inoperative, another terminal may take over and serve as the base station. In U.S. Pat. No. 5,943,322 Mayer, et al., which patent is incorporated by reference herein, the radio system thereof is for use in battlefield conditions, where personal voice communications is based on a time division duplex (TDD) technique in a its own spectrum limitations. TDD systems, however, have not hitherto been deployed for voice systems.

Past research has shown that conventional Carrier Sense Multiple Access (CSMA) algorithms experience diminishing returns when networks approach their ultimate capacity. The vast majority of current research centers on channel access algorithms that provide transmission capacity over a single shared medium. An example of this is the IEEE 802.11 wireless standard which employs a Carrier Sense Multiple Access/Collision Avoidance (CSMA/CA) algorithm. All users within a Basic Service Set (BSS) share a common channel resource.

Reference is also had to copending, commonly-owned U.S. patent application Ser. No. 09/815,164, filed on Mar. 22, 2001, entitled "Prioritized-Routing for an Ad-Hoc, Peer-to-Peer, Mobile Radio Access System", now U.S. Pat. No. 6,873,839, in which there is disclosed an example of routing table messaging which may be used in the present invention.

Reference is also had to commonly-owned pending provisional patent application Ser. No. 60/297,769, filed on Jun. 14, 2001, entitled "Embedded Routing Algorithms under the Internet Protocol Routing Layer in a Software Architecture Protocol Stack". The protocol stack of the system of this application defines the various algorithms used in establishing the connection of a radio terminal of the ad-hoc, peer-to-peer radio system disclosed in the present invention within its neighborhood of other terminals, with a gateway, and for setting necessary parameters for setting up and receiving calls, and updating necessary routing, power-level, quality-of-service parameters, as well as other essential processes used in the ad-hoc system of the present invention.

SUMMARY OF THE INVENTION

It is the primary objective of the present invention to provide an ad-hoc peer-to-peer radio access system that has the capability of interconnection with the switched cellular network, the PSTN, the Internet, and other networks, which is accomplished by the addition and utilization of gateways and gateway controller function.

It also a primary objective of the present invention to provider such interconnection with the switched cellular network, the PSTN, the Internet, and other networks, in which there is complete transparency between the extraneous network and the ad-hoc, peer-to-peer radio system of the invention, and which system is capable of receiving and transmitting voice, data and video calls, where voice calls may be transmitted and received over the cellular switched network, PSTN, or the Internet, and where data and video may be transmitted and received over the PSTN or the Internet.

The system of the present invention utilizes gateways and a gateway controller that provide the interlacing and transparency between the ad hoc terminals of the system of the present invention and those of a conventional or next-generation cellular network, or the PSTN or Internet. The components of the present invention are in addition to the routing and link layers of the ad-hoc transport disclosed in above-mentioned U.S. Pat. No. 6,817,165. The system of the present invention adds capability to the routing layer and call control layers of the underlying ad-hoc network in order to permit the function of interworking or interlacing to bc completed.

According to the ad-hoc, peer-to-peer radio system of the invention having transparent interlacing function with the cellular switched network, the PSTN, the Internet, and other networks, there is provided a system consisting of a series of radio terminals capable of making and receiving at least one of a voice call, data call, or video call between and among other, like, ad-hoc radio terminals of the system, as well as making and receiving calls to and from the cellular switched network, and making and receiving all types of calls to and from the PSTN, the Internet, and other networks. Each radio terminal of the ad-hoc, peer-to-peer radio system of the invention is connected to the outside world via gateways, which gateways are, in turned, connected to a gateway controller which controls the establishment of outgoing and incoming calls via extraneous networks, such as the switched cellular network, the PSTN, the Internet, and the like. For transparently interlacing the ad-hoc radio system of invention to such an extraneous network, the gateway controller is provided with the software for transparently translating the information received either from the exterior network for use by a radio terminal of the ad-hoc radio system of the invention, or from an ad-hoc radio terminal for transmission to a destination via one of the exterior networks.

BRIEF DESCRIPTION OF THE DRAWINGS

The invention will be more readily understood with reference to the accompanying drawings, where:

FIG. 9 is a schematic similar to FIG. 4, but showing the system of the present invention in use as a stand-alone system that may be connected to other telecommunications networks such as the PSTN, an Internet Service Provider (ISP), and the like;

DETAILED DESCRIPTION OF THE INVENTION

Figure 1:
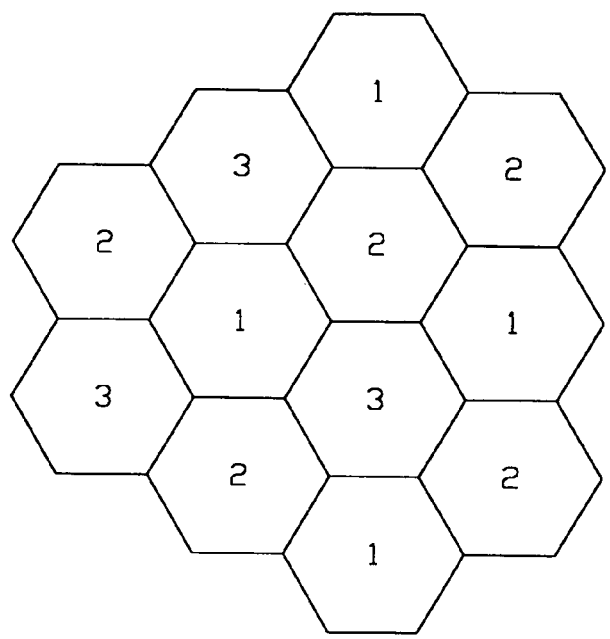
FIG. 1 is a schematic showing the reuse of cells by a conventional cellular system.
Figure 2:
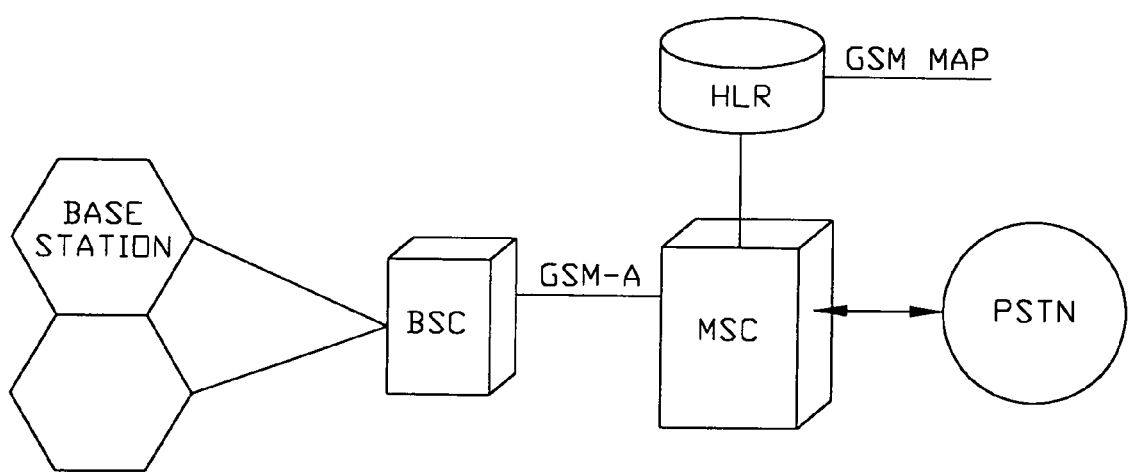
FIG. 2 is a schematic showing a conventional cellular-system architecture with which the system of the present invention is to be deployed.
Figure 3A:
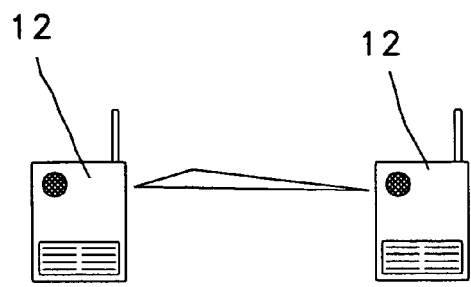
FIGS. 3A and 3B are schematics showing the basic ad-hoc communications between end-users of the system of the present invention.
Figure 3B:
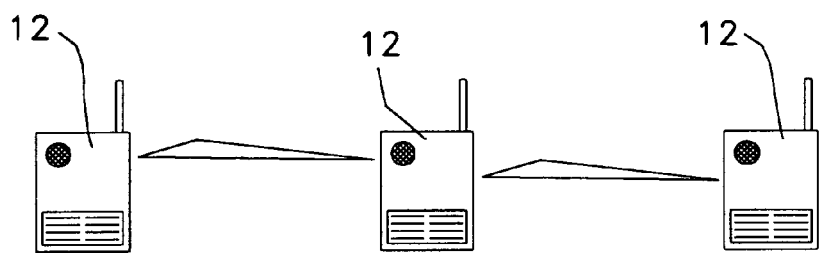
Figure 4:
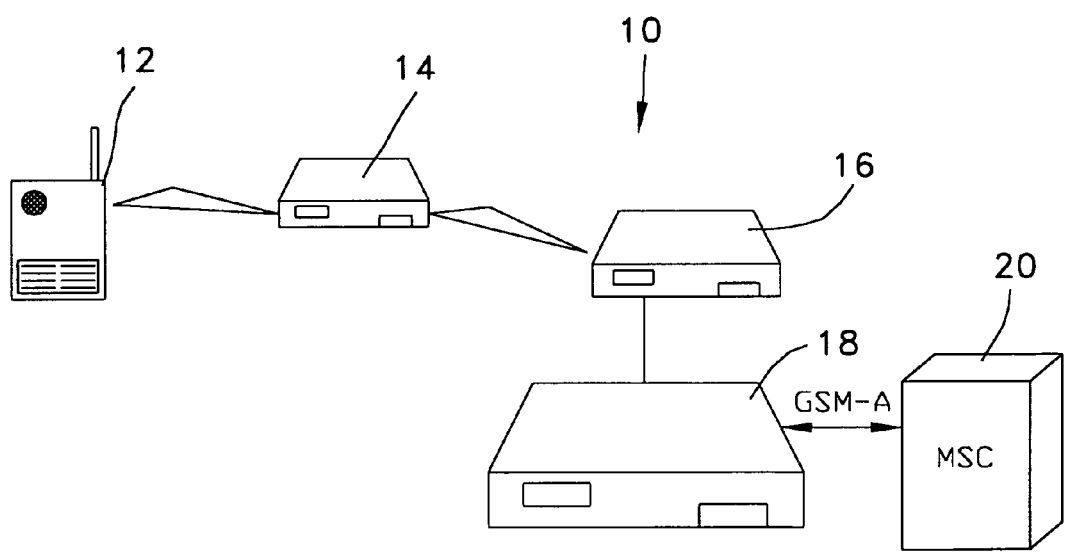
FIG. 4 is a schematic showing the architecture of the system of the present for transparently interworking and interlacing the system of the invention with a conventional or next-generation cellular network system.
Figure 5:
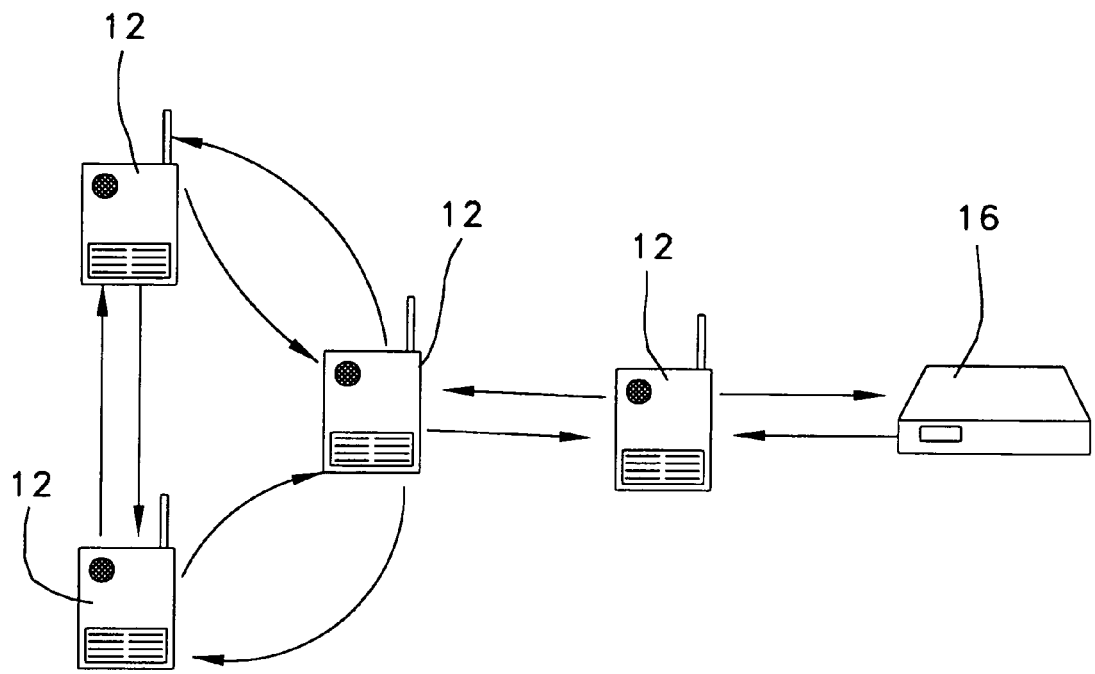
FIG. 5 is a schematic showing the exchange of routing-information tables between a terminal of the system of the present invention with a particular gateway of the system for transparently routing calls to and from the terminal through the cellular network system.
Figure 9:
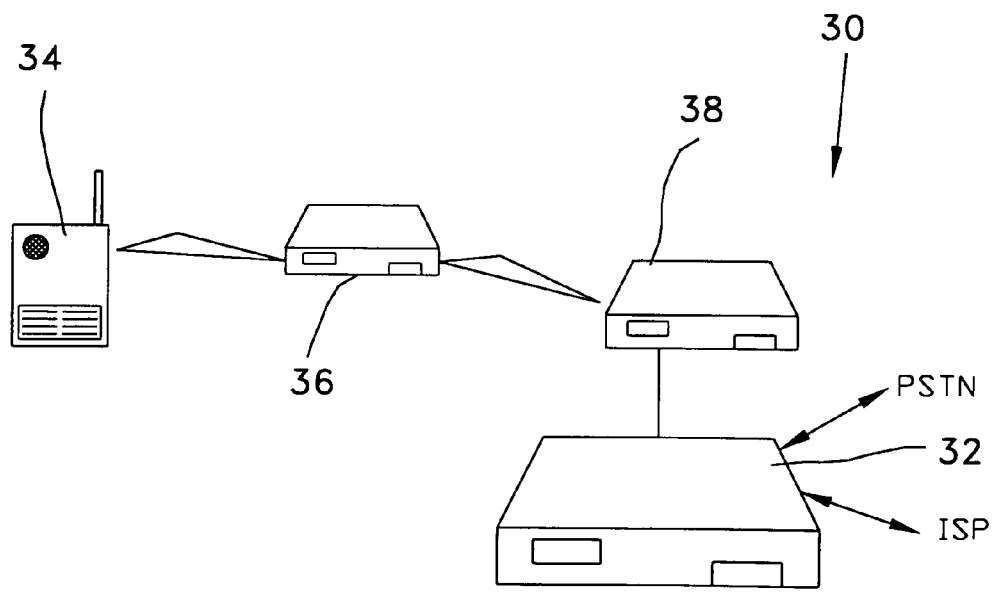

Referring now to the drawings in greater detail, and in particular to FIGS. 3–8, the system of the invention will be described for linking the ad-hoc radio access system 10 of the present invention tot, an external, cellular-switched network. The ad-hoc radio access system of the invention is made up of four main, specific components. As seen in FIGS. 3A, 3B, and 4, these four components are: a plurality of mobile radio terminals 12 capable of receiving and transmitting at least one of voice and data communications, at least one router 14, at least one gateway node 16, and at least one cellular gateway controller 18, which gateway controller is interfaced to the Main Switching Center (MSC) 20 of a conventional or next-generation cellular network system. The capabilities defined within the system of the present invention are contained within the gateway nodes 16 and the gateway controller 18. The gateway controller 18 centralizes all of the interworking or interlacing protocols. Ad-hoc radio terminals 12 may communicate directly with each other as shown in FIG. 3A, or indirectly through other ad-hoc terminals 12 as seen in FIG. 3B. Routers .and gateway nodes are also used, as described hereinbelow, for connecting ad-hoc terminals 12 serviced by one gateway to another ad-hoc terminal serviced by another gateway, as disclosed in above-mentioned U.S. Pat. No. 6,807,165. In accordance with the present invention, the gateways also connect each ad-hoc radio terminal with the cellular switched network via the gateway nodes 16 and gateway controller 18, as seen in FIG. 4.

The router, gateway and gateway controller are the central and main features of the system of the present invention. The addition of these components and the way in which they provide the interworking and integration with the cellular MSC, are described in detail hereinbelow.

There are a number of ways that ad-hoc terminals can communicate with each other in this interworking and integration with the cellular network system. The terminals 10 can communicate directly with each other (FIG. 3A), or they can communicate indirectly through other terminals 12 and/or routers 14, and/or gateways 16 as described above. When they communicate though gateways 16, such communications minimizes the number of hops, or nodes, and through which the terminals may communicate with the switched cellular networks via the gateways 16 and gateway controller 18. The interworking between an ad-hoc radio terminal 12 with the switched cellular network uses H.323 protocol for Voice-over-IP (V0IP) telephony within the packet network, and IS-634 between a gateway 16 and the MSC of the cellular switched network. However, VoIP may be also be achieved using other protocols, such as MEGACO or SIP, while the gateway-to-MSC connection may use protocols such as GSM-A. VoIP call-setup messages are control messages that use TCP/IP, and look like any other on-demand data packet. The actual voice-payload is UDP packets that are quality-of-service (Q0S)-flagged for low latency transport to a gateway, which QoS is disclosed in above-mentioned commonly-owned U.S. Pat. No. 6,873,839 and application Ser. No. 09/882,820. In the preferred embodiment, H.323-specified G.729 vocoders are utilized. In this case, the voice-packets are translated to G.711 for transmission over the telephony links. Each ad-hoc radio terminal has the capability of encoding in the G.711 mode for reducing the translation activity in the gateway. The choice is based on a trade-off at the system engineering level between lower data rates and higher quality.

In order for an ad-hoc terminal 12 to successfully interwork and interlace with a switched cellular network, it must be able to find an access point to the desired network through the gateway controller 18, which is interconnected with the MSC of the external switched cellular network. Furthermore, it must be possible for the external switched cellular network to be able to direct communications to an ad-hoc terminal 12 without knowing the intricacies of the ad-hoc system itself, which means that the coupling provided by the gateway controller 18 must be transparent. One implication or advantage of the chosen method of interworking or integration into an external network is that the features and services are provided to the ad-hoc terminal 12 via the cellular main switching center MSC, and are, therefore, consistent with the features and services provided to a standard cellular telephone.

Figure 6:
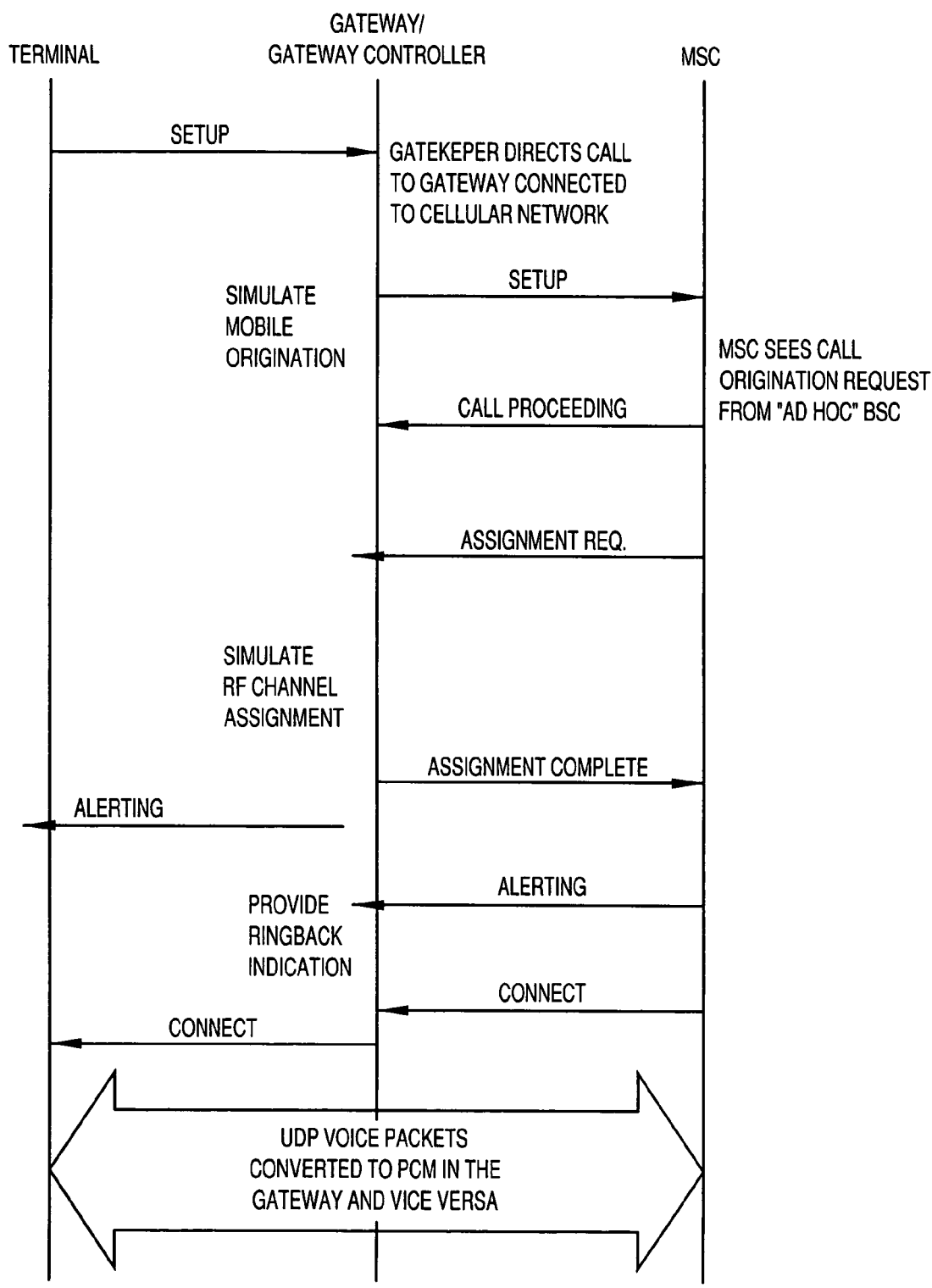
FIG. 6 is a signal-flow diagram showing the origination process of a terminal of FIG. 5 with the mobile switching center (MSC) of the conventional or next-generation cellular network system via the gateway and gateway controller of the system of the present invention, where an originating call from an ad-hoc radio terminal of the ad-hoc radio system of the present invention to the cellular network system.

Each gateway node 16 in the ad-hoc network system of the invention identifies itself as a special class of device, whereby each has the capability to access an external switched cellular network. This information is provided as part of the messaging on the control or reservation information channel within the ad-hoc network protocols, such that terminals 12 can readily identify~' gateways 16, as explained in above-mentioned U.S. Pat. No. 6,807,165. An ad-hoc terminal 12 that wishes to be considered part of an external cellular network will first have to register with a gateway node 16 typically via other ad-hoc terminals serving as nodes or hops to the gateway, which is accomplished by exchanging routing tables, as set forth in above-mentioned U.S. Pat. No. 6,877,839 (see FIG. 5). This is part of the initialization process of the terminal itself. The terminal 12 will identify itself to a respective chosen gateway 16 with a registration message. The gateway 16 will perform the following functions on receipt of a registration message, as shown in FIG. 6. It will validate the authenticity of the terminal, through the gateway controller 18, using GSM-A authentication and location-update procedures, and then provide a temporary address, within the gateway, for that terminal. This is deposited in a database of the gateway controller 18 for any further communication with the terminal. The gateway 16 will create a record of the terminal in its "Active Register" (AR), which is a database of all terminals 12 linked to that respective gateway 16. At some future point the terminal may move beyond the view of the current gateway and will need to register with a new gateway 18. The new gateway will go through the same sequence of events as the original gateway with the gateway controller 18, but will not require the GSM-A interaction with the MSC. The gateway controller 18 will, in addition to updating the temporary address, inform the original gateway to remove the terminal from its "Active Register" database.

Terminals 12 routinely exchange routing table information in order for them to be able to route to each other and through each other to distant terminals, in a manner disclosed in above-mentioned U.S. Pat. No. 6,807,165. These exchanges typically occur every couple of seconds. The routing tables include information about the quality of the link between two terminals, the distance between the terminals and indications of the congestion levels of each terminal, as explained in above-mentioned U.S. Pat. No. 6,807,165. Gateways 16 identify themselves as a special class of terminal that can provide access to terminals and networks outside the current field of view.

Referring to FIG. 6, there is shown the call-origination process. Messages indicated in bold print are IS-634 messaging, while those shown in italics are H.323 messaging. When a terminal 12 originates a call for communication with a remote subscriber of the cellular network via the MSC 20, it will initiate a setup-dialog with the gateway with which it is registered, identifying the destination to which is wants to be connected. The gateway has no knowledge of the destination addressing or routing, so it will query the gateway controller 18 for routing information. The gateway controller will connect to the cellular-network gateway coupled to the cellular network, and will communicate with the MSC initially with the SETUP messaging in IS-634 protocol. The MSC sees the simulated call-origination request coming from the gateway controller as another base station controller (BSC), and responds with a "Call Proceeding" message also in IS-634 format back to the gateway controller to tell the gateway controller that call-setup is in process. The MSC also sends an "Assignment Request" in IS-634 format to the gateway controller for a specific RF channel assignment. The gateway controller then simulates the RF-channel assignment for the MSC, and returns to the MSC as an "Assignment Complete" message in IS-634 format. At this time, the gateway controller sends an "Alerting" message to the originating ad-hoc terminal in H.323 messaging, such as ringback. The MSC then returns its own "Alerting" message to the gateway controller in IS-634 messaging. The call is thereafter connected. The voice packets are converted from UDP voice packets to PCM in the gateway or gateway controller, and vice-versa for the voice packets from the radio terminal of the cellular network. VoIP could also be based on MEGACO or SIP protocols, while the messaging between the gateway controller and the MSC could be Global Title Translation in SS7 or URL resolution provided by an IP domain name server. This will result in GSM-A messaging.

Figure 7:
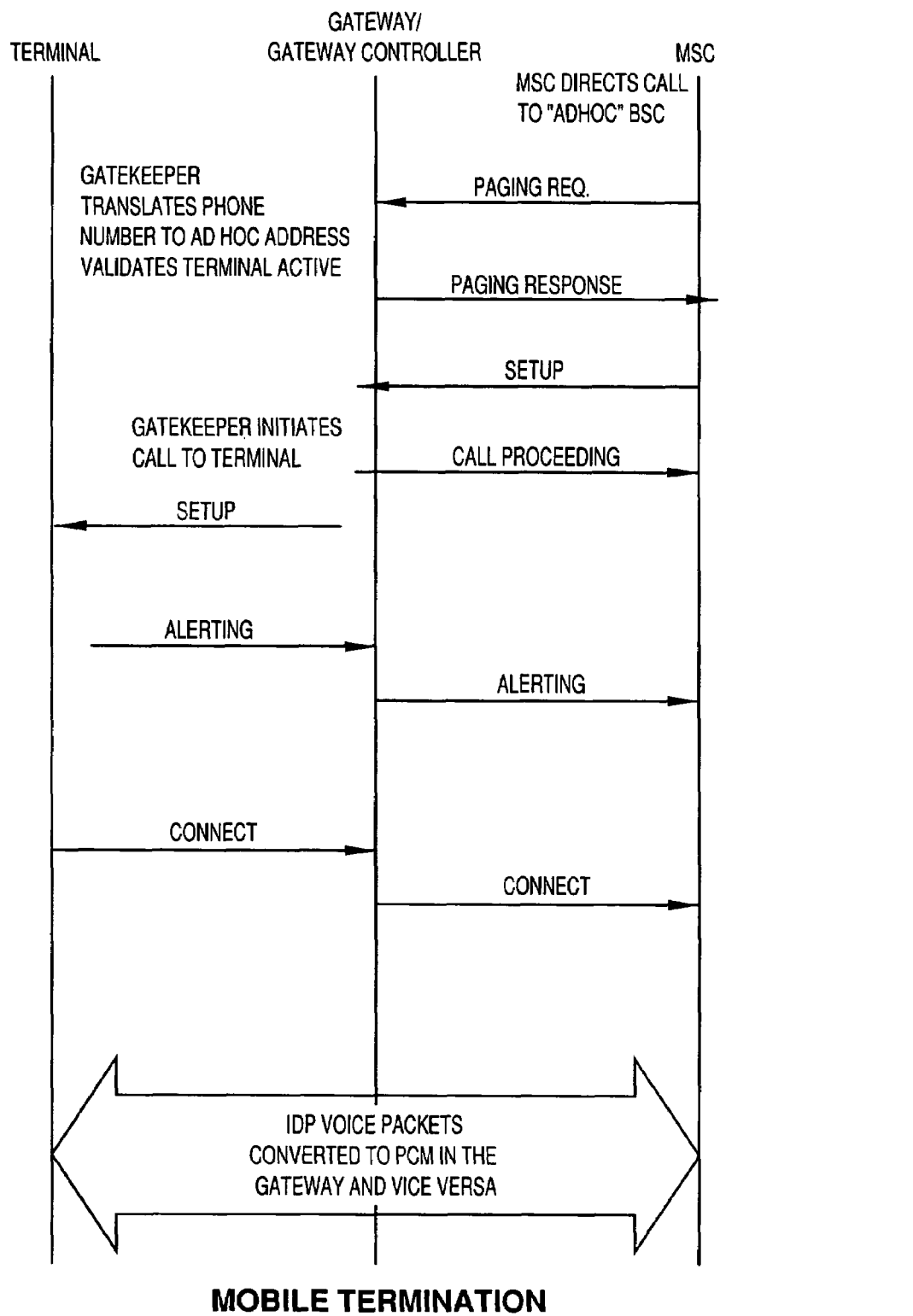
FIG. 7 is a signal-flow diagram similar to FIG. 6 showing the cellular-network activated process of call processing with the ad-hoc radio system of the present invention via the MSC of the cellular network system and the gateways and gateway controllers of the system of the invention, when the ad-hoc terminal is a mobile-termination that receives a call from a terminal of the cellular network system.

Referring to FIG. 7, there is shown the call-setup when a remote subscriber of the cellular network originates the call and an ad-hoc terminal 12 is the mobile termination. Messages indicated in bold print are IS-634 messaging, while those shown in italics are H.323 messaging. The cellular user wishing to connect to a terminal 12 of the system 10 of the invention will have the telephone number, or other identifying data, for the respective terminal of the ad-hoc radio system 10, which telephone number is understandable by the MSC 20. The address will point to the identity of the gateway controller 18 (which acts as a base station controller to the MSC) that services the terminal. On receipt of an external request, which is a "Paging Request" from the MSC to the gateway controller, the gateway controller 18 will respond with a "Paging Response". The gateway controller translates the phone number received from the MSC to the address of the termination ad-hoc terminal, and will determine to which current gateway 16 the respective terminal 12 is registered, and provide routing information to the external network to allow a virtual connection to be established with the ad-hoc terminal through a respective gateway 16. The MSC then sends a "SETUP" message to the gateway controller, and returns a "Call Proceeding" message back to the MSC. The gateway controller then establishes the setup with the ad-hoc terminal via the routing path indicated. The ad-hoc terminal sends an H.323 "Alerting" message back to the gateway controller, which in turn sends an IS-634 "Alerting" message to the MSC. The call is then connected, with the voice packets being converted from UDP voice packets to PCM in the gateway or gateway controller, and vice-versa for the voice packets from the radio terminal of the cellular network.

Figure 8:
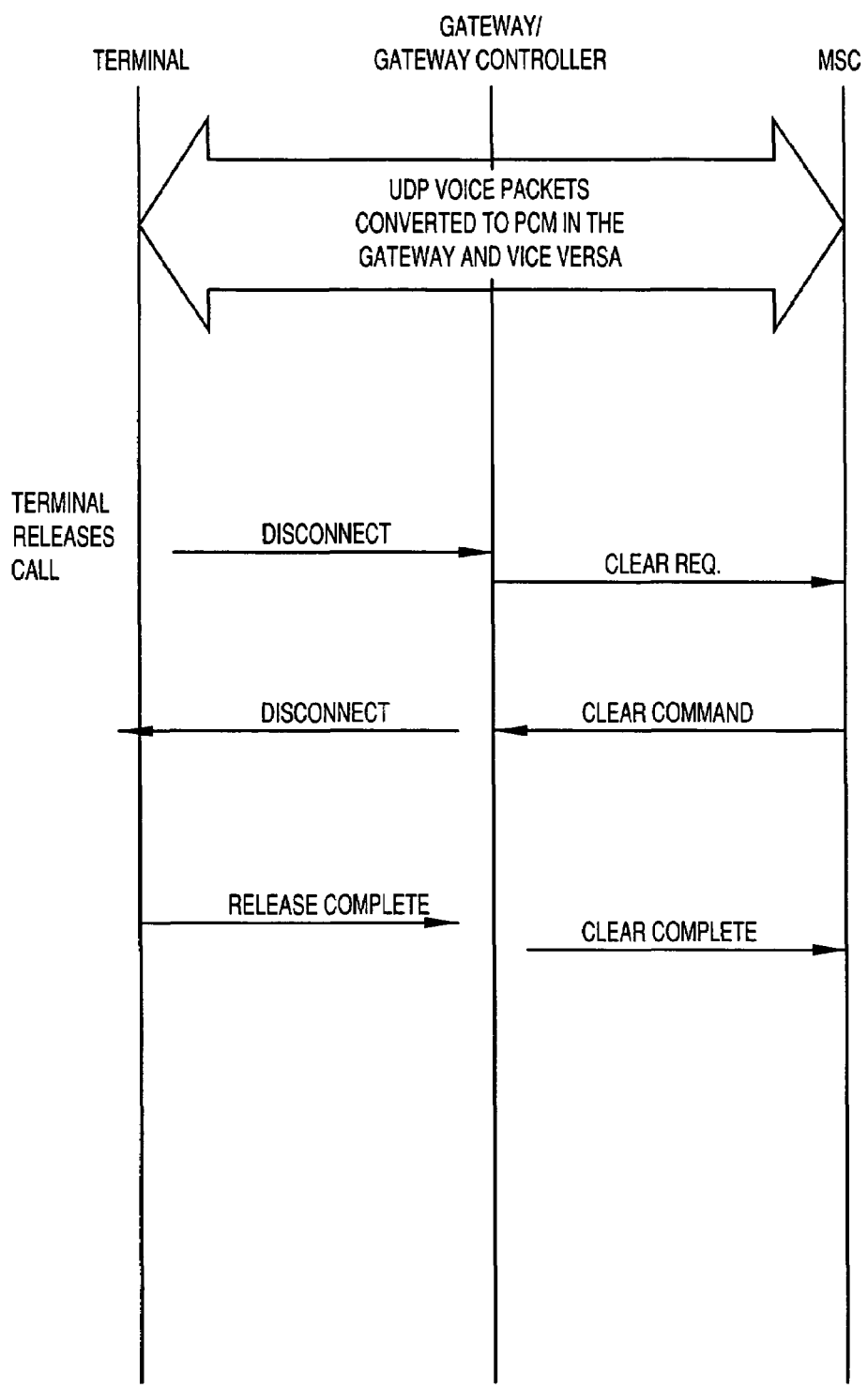
FIG. 8 is a signal-flow diagram similar to FIG. 7 showing the mobile-clearing call-processing with the ad-hoc radio system of the present invention upon the termination of a call between an ad-hoc radio terminal of the ad-hoc radio system of the invention and a mobile subscriber of the cellular network system.

Referring to FIG. 8, there is shown the "Mobile Clearing" process after a call from between an ad-hoc terminal 12 and a remote subscriber of the cellular network has been completed. Messages indicated in bold print are IS-634 messaging, while those shown in italics are H.323 messaging. The ad-hoc terminal disconnects, sending a H.323 "Disconnect" message to the gateway controller, which in turn sends a IS-634 "Clear Request" to the MSC. The MSC sends back a "Clear Command" to the gateway controller, which in turn sends a "Disconnect" message to the ad-hoc terminal. The ad-hoc terminal responds with a "Release Complete" message to the gateway controller, which in turn forwards a "Clear Complete" message back to the MSC.

The above-description has dealt with the connection of voice calls between the ad-hoc radio system 10 and an external switched cellular network. However, the terminals 12 are also capable of sending and receiving data and video messages. For this purpose, the ad-hoc radio system 10 of the invention is connected to an external PSTN or to an Internet Service Provider (ISP), or other external network. Thus, when a terminal initiates an outgoing data call, which is an IP data message, the respective gateway 16 will recognize it as a data message, and will route the call to the gateway controller 18, which will direct the call to another gateway thereof that is coupled with the external PSTN, ISP, and the like, besides being linked to the switched cellular system, as described hereinbelow in greater detail.

The initial data-call request by a terminal 12 to a gateway 16 is handled in the same manner as shown in FIG. 7; however, the gateway controller 18 will recognize the call-request as one that the external cellular system cannot handle, whereby it will route the request to another one of its gateways operatively associated with the appropriate external network that can communicate with the appropriate service provider, such as an ISP for internet access, or the PSTN.

Referring to FIGS. 9 through 15, there will be described the four major components of the system 30 of the invention in its capacity as a stand-alone, peer-to-peer, mobile radio networking system, which is operatively connected to any external telecommunications network, such as the switched cellular network, PSTN, the Internet, and the like. There are four specific components defined for the ad-hoc access network, as described hereinabove. The gateway controller 32 (FIG. 14) centralizes all the interworking protocols with the external networks. Terminals 34 can communicate directly with each other, indirectly through routers 36 or gateways 38, and with other networks via the gateway/gateway controller. For the sake of clarity, the functions of the gateway controller are described separately from the gateway, though the gateway controller function may be distributed to the gateways in some network configurations.

The combination of the radio, the base-band modem and the processor that provides the link layer and routing software is the transceiver 40 (FIG. 11), which link layer and routing software form part of a protocol stack, as described in above-mentioned provisional application Ser. No. 60/297,769, filed on Jun. 14, 2001, entitled "Embedded Routing Algorithms under the Internet Protocol Routing Layer in a Software Architecture Protocol Stack". The transceiver is specified in such a way that different radio spectra and standards may be supported at the physical layer without changing the basic link layer and routing software. The transceiver 40 includes a network interface (NI) which is a computer industry standard such as IEEE-802 Ethernet or PCMIA. The sole purpose of the NI is to support communications with software application components in the terminal or the networking components in the gateway.

The user terminal 34 (FIG. 12) consists of a transceiver 40 and an application processor, such as a notebook computer or Personal Digital Assistant (PDA). The application processor provides the user interface and software applications that make use of the underlying transport. The user terminal likely has a limited battery-based power supply. A router 36 (FIG. 13) consists of a transceiver 40 with a permanent power supply. The router has specific functions in the deployment of a network, as described hereinbelow. A gateway 38 (FIG. 14) consists of a transceiver 40 and a physical connection to the Wide Area Network (WAN) of the gateway controller 32. It is possible to distribute the functions of the gateway controller to the gateways.

Figure 15:
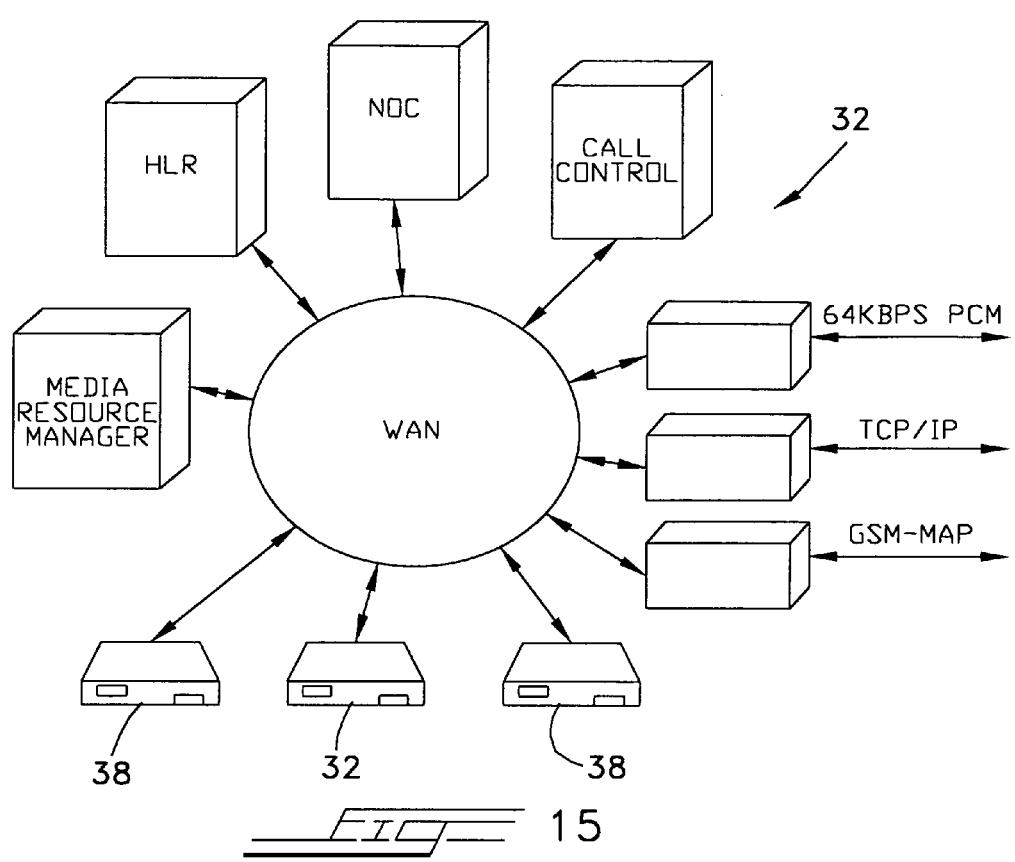
FIG. 15 is a schematic view showing a gateway controller used in the system of the system of the present invention to connect the system to a telecommunications network.

The gateway controller 32 aggregates a number of ad-hoc gateways 38 and provides common services such as interworking gateways, billing, provisioning and other administration functions for a complete network (FIG. 15). The gateway controller 32 consists of an Home Location Register (HRL) or Name Server 50, Media Resource Manager (MRM) 52 which includes hardware such as voice mail, recorded messaging such as all circuits busy, etc., Network Operation Center (NOC) 54 that includes operations for billing, accounting, managing, etc., Call Control 56 for voice mail, call forwarding, etc., or for whatever the subscriber has signed up, TCP/IP Internet connection gateway 58, IS-41/GSM-MAP hardware interface to cellular network 60, PSTN interface connection PCM 62, and wide area network (WAN) 64.

Figure 10A:
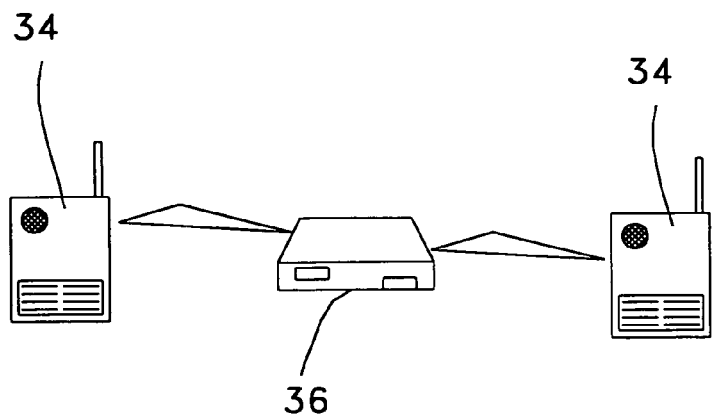
FIGS. 10A–10C are schematic views showing the different ways a call may be transmitted using the hardward components of the system of the present invention.
Figure 10B:
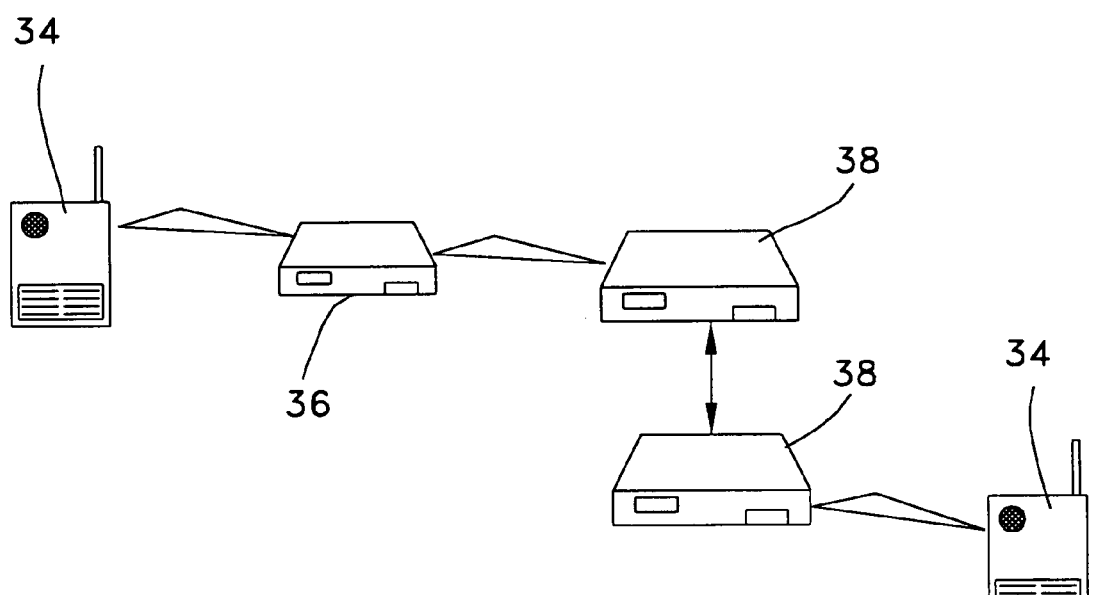
Figure 10C:
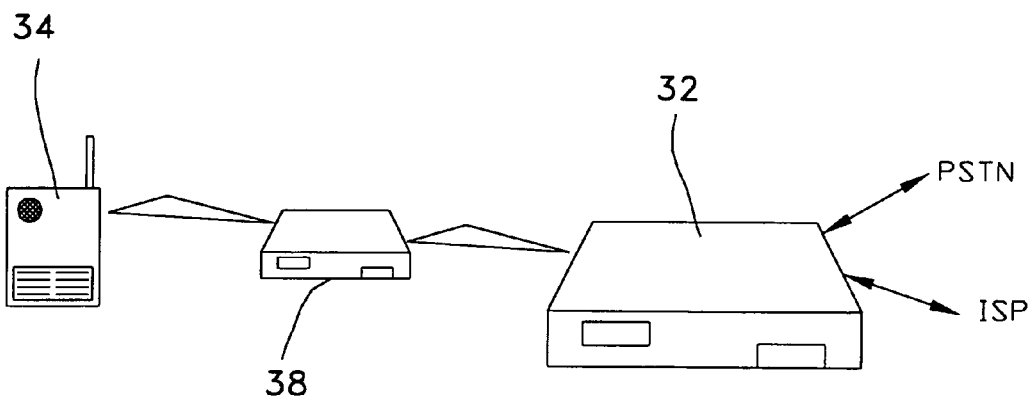
Figure 11:
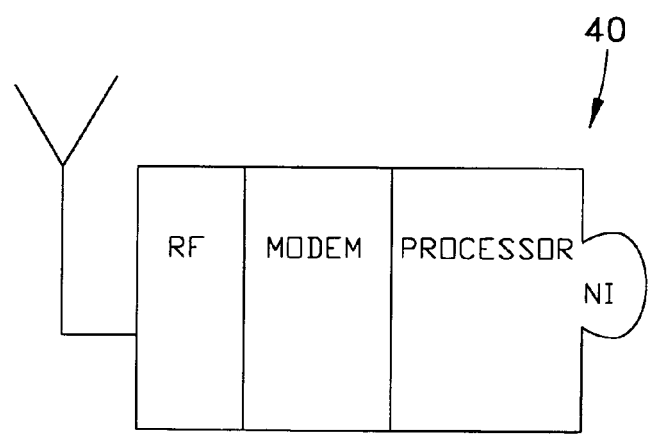
FIG. 11 is a schematic view showing the parts of a transceiver used in the system of the system of the present invention.
Figure 12:
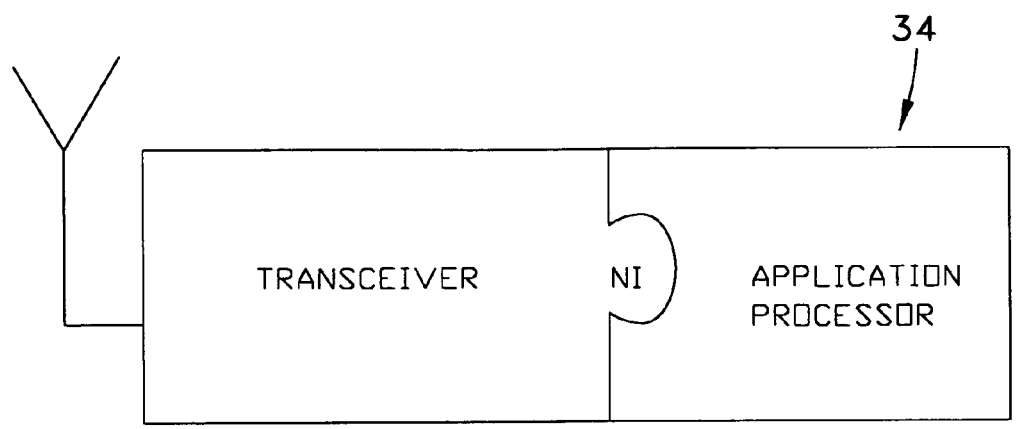
FIG. 12 is a schematic view showing the parts of an end-user's terminal used in the system of the system of the present invention.
Figure 13:
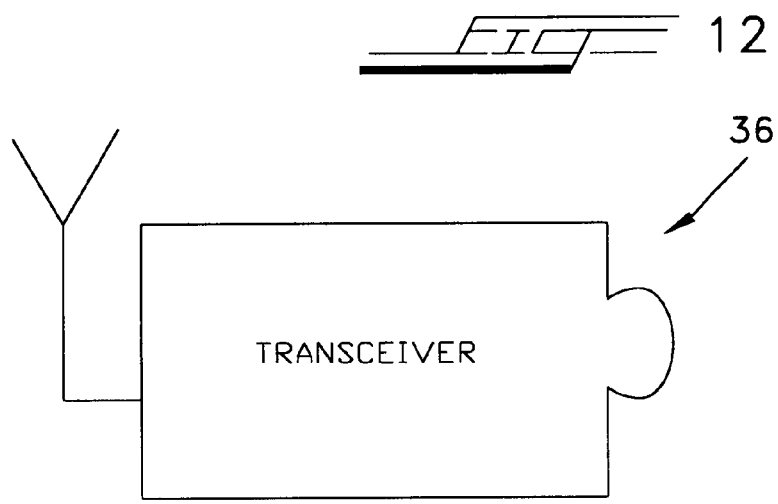
FIG. 13 is a schematic view showing a router used in the system of the system of the present invention.
Figure 14:
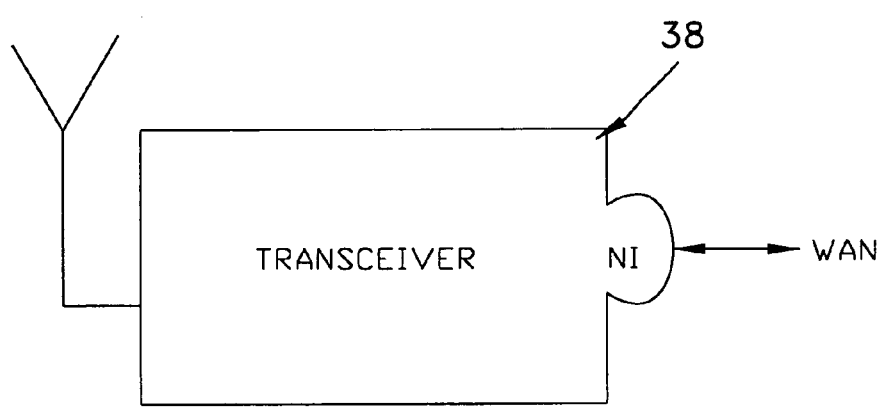
FIG. 14 is a schematic view showing a gateway used in the system of the system of the present invention.

There are a number of ways that ad-hoc terminals 34 can communicate with each other in the design of this interworking. The terminals can communicate directly with each other, they can communicate indirectly through other terminals and/or routers (FIG. 10A), they can communicate though gateways to minimize hops (FIG. 10B), and they can communicate with other telecommunications networks via gateways and gateway controllers (FIG. 10C). At some point, a terminal may move beyond the view of the current gateway and will need to register with a new gateway. The new gateway will go through the same sequence of events as the original gateway, but the gateway controller will, in addition, to updating the temporary address, inform the original gateway to remove the terminal from its Address Register (AR). When a terminal 34 wants to communicate directly with an external network, it will initiate a dialog with its new gateway 38 identifying the destination.

An external network user, such as that of the PSTN, wishing to connect to the terminal 34, has an address that is understandable by that network. The address will resolve to the identity of the gateway controller 38 that owns the terminal. On receipt of an external request, the gateway controller 32 will determine which current gateway 38 the terminal is accessing and provide routing information to the external network to allow a virtual connection to be established with the terminal through the gateway.

Figure 16:
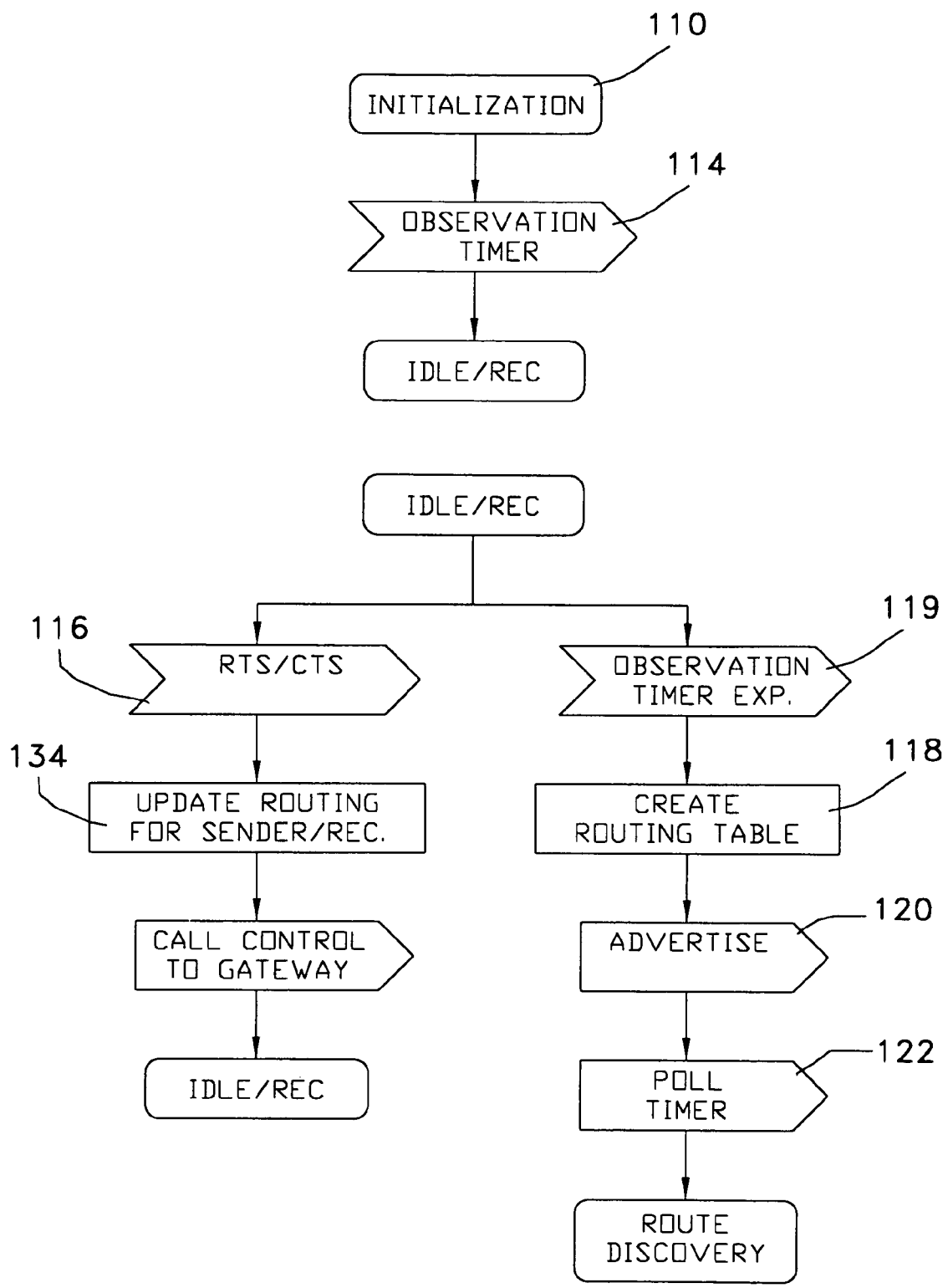
FIG. 16 is a flow chart showing the initial registration process for an ad-hoc radio terminal of the radio system of the invention upon first power-up.

Referring to FIGS. 16–20, there are shown flow charts for the process of an ad-hoc radio terminal 34 for initial power-up and registration with a gateway in order to access the external switched cellular network. In FIG. 16, the terminal upon initial power-up or entry into a new neighborhood of other radio terminals (block 110), will listen to messages being sent out by other terminals (Block 112). An observation timer (blocks 114) is set to allow sufficient time to the terminal to hear communications from neighboring terminals. It listens for RTS/CTS signals which are on the reservations channel, as opposed to ACK and NACK etc. which are on the data channels (Block 116). The terminal computer then creates a routing table (block 118) based on RTS/CTS signaling received (block 116). After creating the initial routing table based on neighborhood terminals, it advertises itself (block 120) by sending out request-to-register messaging. The poll timer (block 122) allows enough time to hear back from many terminals, so that many different gateways (IAP's) may be discovered, in order to determine the most optimal gateway, or to determine if no gateway is available in that neighborhood.

Figure 17:
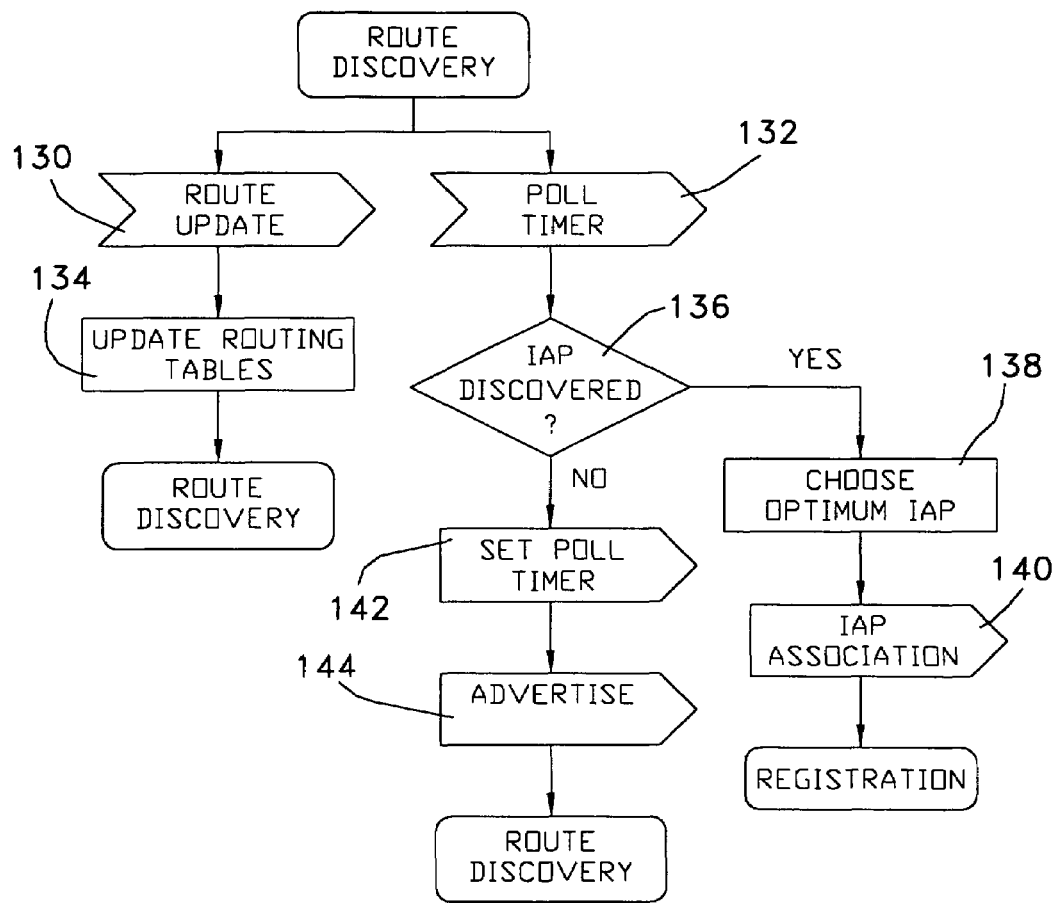
FIG. 17 is a flow chart showing the route-discovery process for an ad-hoc radio terminal of the radio system of the invention for establishing its neighborhood of other like radio terminals, in order to establish registration with one, chosen Intelligent Access Point (AIP), or gateway.

Referring now to FIG. 17, there is depicted Route Discovery which determines with which gateway to register, based on Quality-of-Service characteristics (QoS), least energy routing, voice or data call, etc. The terminal listens to other radio terminals in the neighborhood that respond to its advertising message, and updates its routing table based thereon (block 130). The poll time (block 132) allows enough time so that many different gateways (IAP's) may be discovered in order to determine the most optimal gateway, as set forth above. The exchange of information between it and other neighborhood terminals causes the terminal to update its routing table (block 134). The terminal looks to see how many, if any, gateways are available (decision block 136), which was part of the route update. If IAP's were discovered, it chooses the optimal one (block 138), and sets the software module to associate with that optimal one (block 140) via the registration process (block 141) of FIG. 18 described hereinbelow. If no IAP has been discovered, then the poll timer is reset (block 142), in order to begin advertising again (block 144) as in FIG. 16. This will continue, but in the meanwhile it will be part of an isolated network that has no communication with the outside world.

Figure 18:
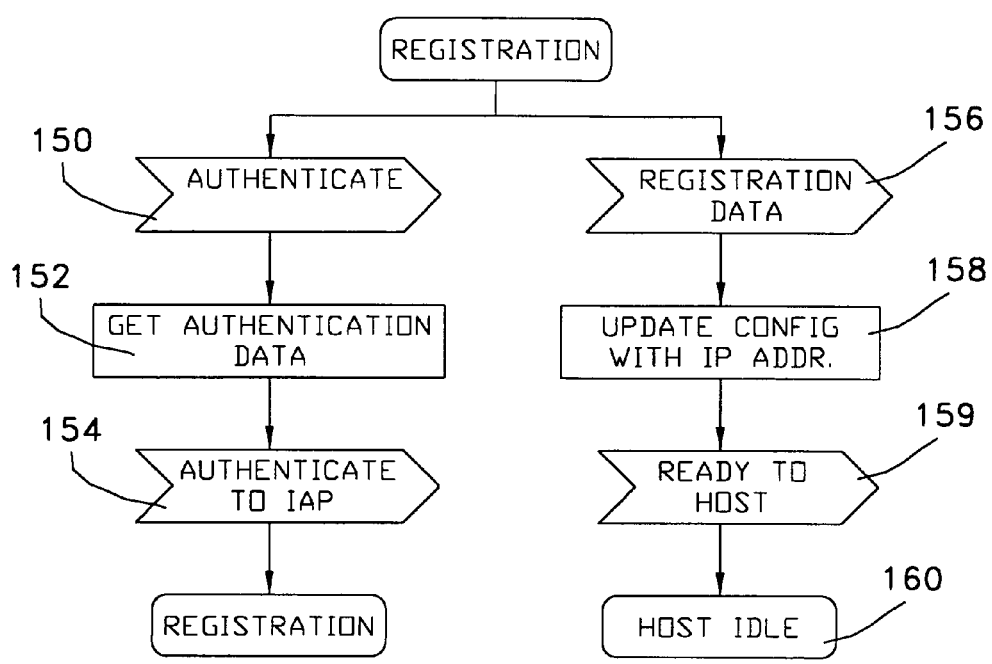
FIG. 18 is a flow chart showing the actual registration process for an ad-hoc radio terminal of the radio system of the invention the selected gateway.
Figure 19:
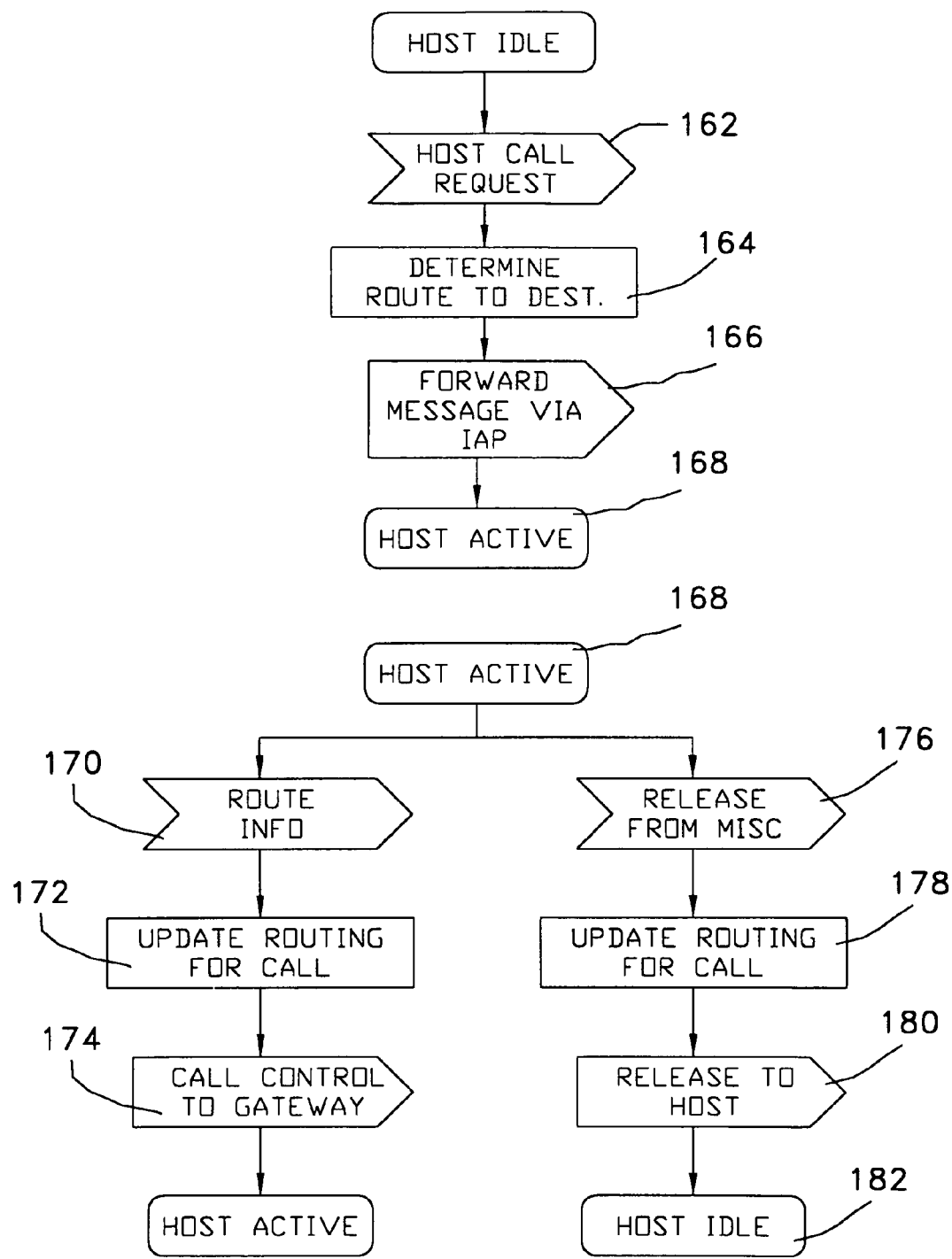
FIGS. 19A and 19B are flow charts showing the call-initiation process for an ad-hoc radio terminal of the radio system of the invention for making an outgoing call to a destination serviced by an external network to which the gateway controller of the invention in linked.

Referring to FIG. 18, there is shown the Registration Process with an IAP, or Gateway. The terminal will send out an authentication request to the chosen IAP (blocks 150 and 152), which is serial number, or the like, and is sent to LAP (block 154). If authenticated, the LAP will send back registration data information (block 156) which is the network ID for it, such as a unique telephone number. The terminal then updates its IP address for that chosen LAP with which it is registered (block 158). All this is done by its radio transceiver. Then, the transceiver tells the terminal's computer (block 159) that it is ready for calls, whereupon the host computer of the terminal is idle (block 160), awaiting call-origination (FIG. 19).

Figure 19A:
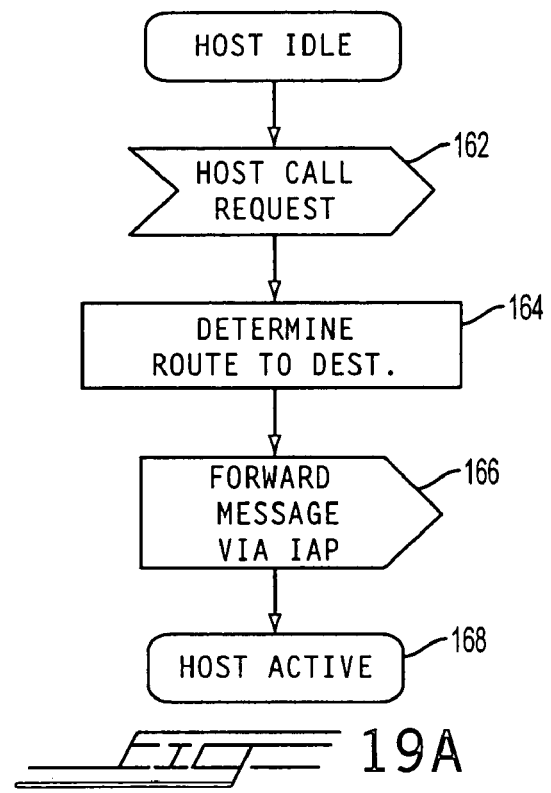
Figure 19B:
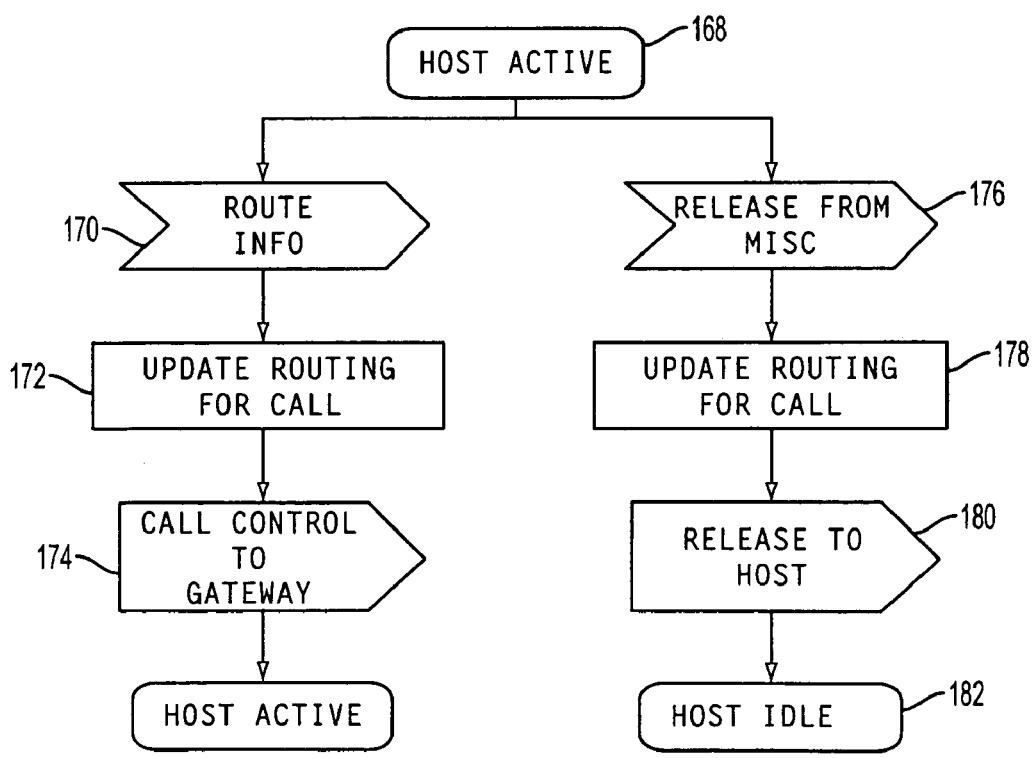

Referring to FIGS. 19A and 19B, there is shown the Call-Initiation process of a voice call to an external switched cellular network via the chosen IAP and the Gateway Controller. The host computer initiates a call-request, and makes an outgoing call (block 162), which is TCP messaging to the radio transceiver. The route is determined by the host computer (block 164), and the radio sends out the proper messaging, such as RTS and CTS signaling on reservations channel, or ACK, NACK etc. on the data channels to its associated IAP (block 166). The host is then active (block 168). Thereafter, routing information is determined (block 170), and the routing information is sent out (block 172), which includes the destination's telephone number. This number is sent to the terminal's associated gateway (IAP), which gateway then relays the call to the Gateway Controller (block 174), which determines to which of its interface connections to connect. If it is a call to the external switched cellular network, then it directs the call to the IS-41/GSM-MAP hardware interface or gateway. If it is call to the PSTN, then it directs the call to PSTN interface connection PCM. If it is a call to the ISP, which uses IP protocol, then it directs the call directly to the TCP/IP Internet connection gateway. After call termination, the respective dedicated interface, or gateway, will release the call (block 176), and send the appropriate messaging back to the terminal via its associated gateway. The terminal will then update its routing table for that call (block 178), which essentially means it will erase that call's information from its routing table entirely. The terminal is then released from connection to its gateway (IAP) (block 180), and the host terminal returns to its idle state (block 182).

Figure 20:
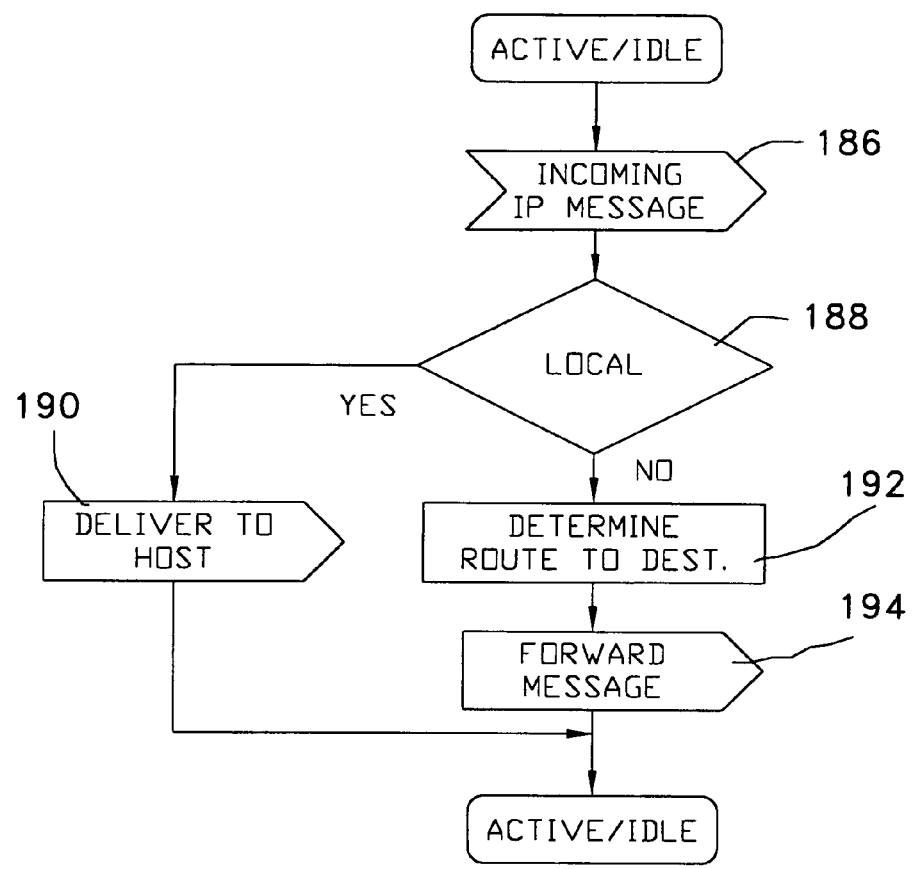
FIG. 20 is a flow chart showing the gateway processing when such gateway receives an incoming call.

Referring to FIG. 20, there is shown Router/Gateway action processing when it receives a call. When it receives a call, which is an IP-protocol message, as translated by the gateway controller if coming from an external switched network, or direct IP messaging if coming from another ad-hoc terminal registered with it or from an ISP, (block 186). It determines if it is a local call (block 188), which local call means that the call is for itself. If it is for itself, then it delivers the message to its own host computer (block 190). If not, then it is an ad-hoc network call to an ad-hoc terminal, and it determines the best route to it (block 192). In this case, the call was sent to it since the terminal to which the call is directed is registered with that gateway. It then forwards the call (block 194).

While specific embodiments of the invention have been shown and described, it is to be understood that numerous changes and modifications may be made therein without departing from the scope and spirit of the invention.

What is claimed is:

1. An ad-hoc radio system comprising:
   a series of remote radio terminals each comprising a radio transceiver and a control processor, said control processor comprising software means for determining a routing path of a call, for communicating with other said radio terminals, and for establishing the respective said radio terminal as a hop for other said radio terminals during a call-connection;
   a plurality of gateways, each said gateway being in operative communication with at least some of said series of remote radio terminals;
   a gateway controller in operative communication with said plurality of gateways;
   said gateway controller comprising call control and routing means for directing calls to a destination, and interconnecting means for connecting said series of remote radio terminals to an external network, whereby originating calls from a said radio terminal may be directed to a destination serviced by the external network and calls originating from the external network may be directed to a said radio terminal;
   said call control and routing means comprising routing information means for directing an originating call from a said radio terminal via a said gateway to an external network, and for directing a call from an external network to a said radio terminal via a said gateway; and a plurality of wireless routers operatively connected between said series of remote terminals and said plurality of gateways for wirelessly interconnecting said series of radio terminals and for wirelessly interconnecting said series of radio terminals to said plurality of gateways, whereby said remote radio terminals may indirectly communicate with each other and said gateways through one or more said wireless routers.

2. The ad-hoc radio system according to claim 1, wherein said interconnecting means comprises means for connecting to one of a: switched cellular network, a PSTN, and an Internet Service Provider (ISP).

3. The ad-hoc radio system according to claim 2, wherein said interconnecting means further comprises interfacing means for translating identifying information received from a switched cellular network and for translating identifying information received from a said gateway.

* * * * *